(12) United States Patent
Mooney et al.

(10) Patent No.: US 10,491,113 B1
(45) Date of Patent: Nov. 26, 2019

(54) TRANSMIT-RECEIVE SYSTEM HAVING THREE OPERATING MODES

(71) Applicant: Raytheon Company, Waltham, MA (US)

(72) Inventors: Claire E. Mooney, Dallas, TX (US); David D. Heston, Dallas, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/380,396

(22) Filed: Apr. 10, 2019

Related U.S. Application Data

(60) Division of application No. 15/185,363, filed on Jun. 17, 2016, now Pat. No. 10,305,376, which is a continuation of application No. 14/933,249, filed on Nov. 5, 2015, now abandoned.

(51) Int. Cl.
*H03K 5/08* (2006.01)
*H02M 3/07* (2006.01)

(52) U.S. Cl.
CPC ..................... *H02M 3/07* (2013.01)

(58) Field of Classification Search
CPC ............. H04L 25/0278; H04L 25/0298; H04L 25/028; H03K 19/0005; G06F 13/4086
USPC ..................... 327/309–315; 326/30
See application file for complete search history.

(56) References Cited

U.S. PATENT DOCUMENTS

| | | | |
|---|---|---|---|
| 5,982,198 A | 11/1999 | Fulkerson | |
| 6,051,989 A * | 4/2000 | Walck | G06F 13/4086 326/30 |
| 6,356,106 B1 * | 3/2002 | Greeff | G06F 13/4086 326/30 |
| 7,263,337 B2 | 8/2007 | Struble | |
| 7,755,222 B2 | 7/2010 | Heston et al. | |
| 7,978,448 B2 | 7/2011 | Chee et al. | |
| 10,305,376 B1 | 5/2019 | Mooney et al. | |
| 2003/0214768 A1 | 11/2003 | Lin et al. | |
| 2004/0212937 A1 | 10/2004 | Marholev | |
| 2004/0233595 A1 | 11/2004 | Ker et al. | |
| 2006/0256489 A1 | 11/2006 | Ker et al. | |
| 2007/0069305 A1 | 3/2007 | Kuboyama et al. | |
| 2007/0297106 A1 | 12/2007 | Dai et al. | |
| 2011/0116558 A1 | 5/2011 | Otaka et al. | |
| 2014/0368958 A1 | 12/2014 | Ikimura | |
| 2016/0238427 A1 * | 8/2016 | Nusseibeh | G01F 23/284 |

OTHER PUBLICATIONS

Palumbo et al., "Charge Pump Circuits: An Overview on Design Strategies and Topologies;" IEEE Circuits and Systems Magazine; First Quarter 2010; pp. 31-45 (15 Pages).

(Continued)

*Primary Examiner* — Anh Q Tra
(74) *Attorney, Agent, or Firm* — Daly, Crowley, Mofford & Durkee, LLP

(57) ABSTRACT

A switchable charge pump (SCP) combines a switching element and a charge pump. An SCP can be utilized within an RF circuit to allow the charge pump to be activated or deactivated in the circuit depending on incident RF power level. Multiple SCPs can be utilized to provide a generalized a single-pole N-throw (SPNT) system architecture. In one example, an RF transmit-receive (T/R) system utilizes SCPs to operate in one of three modes: transmit mode, receive mode, or self-selecting terminate mode.

15 Claims, 3 Drawing Sheets

(56) References Cited

OTHER PUBLICATIONS

Appeal Brief filed dated Oct. 10, 2017 for U.S. Appl. No. 15/185,363; 19 Pages.
Final Office Action dated Feb. 15, 2017 for U.S. Appl. No. 15/185,363; 12 Pages.
Non-Final Office Action dated Oct. 12, 2016 for U.S. Appl. No. 15/185,363; 10 Pages.
Notice of Allowance dated Feb. 19, 2019 for U.S. Appl. No. 15/185,363; 7 Pages.
Reply Brief filed on Jan. 19, 2018 for U.S. Appl. No. 15/185,363; 7 Pages.
Response to Appeal Brief dated Nov. 22, 2017 for U.S. Appl. No. 15/185,363; 10 Pages.
Response to Final Office Action dated Feb. 15, 2017 for U.S. Appl. No. 15/185,363, filed May 15, 2017; 12 Pages.
Response to Non-Final Office Action dated Oct. 12, 2016 for U.S. Appl. No. 15/185,363, filed Jan. 11, 2017; 10 Pages.
Response to Restriction Requirement dated Sep. 9, 2016 for U.S. Appl. No. 15/185,363, filed Sep. 28, 2016; 1 Page.
Restriction Requirement dated Sep. 9, 2016 for U.S. Appl. No. 15/185,363; 5 Pages.

\* cited by examiner

TRANSMIT-RECEIVE SYSTEM HAVING THREE OPERATING MODES

CROSS REFERENCE TO RELATED APPLICATION

This application is a divisional of U.S. application Ser. No. 15/185,363 filed on Jun. 17, 2016, which is a continuation of U.S. application Ser. No. 14/933,249 filed on Nov. 5, 2015, all of which are incorporated herein by reference in their entirety.

BACKGROUND

As is known in the art, radio frequency (RF) systems may include a transmit signal path, a receive signal path, and a common signal path used for transmit and receive. For example, an antenna may be shared between transmit and receive front ends. In such systems, it is desirable to transmit high signal levels with low loss to the antenna while protecting the receive path from high incident signal levels (e.g., signals from an jammer). To protect the receive path, it is known to use a 5-port circulator for narrowband and medium-bandwidth applications.

SUMMARY

It is appreciated herein that improved structures and techniques are needed for broadband radio frequency (RF) systems having a signal path portion common to both transmit and receive signal paths. In particular, it is desirable to provide a fail-safe mode at the antenna (i.e., a matched termination capable of handling high power levels).

Disclosed herein is a switchable charge pump (SCP) network provided from a charge pump and a switch coupled thereto. Adding a switch to a charge pump allows a charge pump to be activated or deactivated depending upon a desired operating mode.

An SCP network can be utilized within a broadband RF system having a plurality of input-output signal paths (e.g., transmit and receive front ends) and a common signal path (e.g., an antenna). In particular, the SCP network can be used to form a single-pole N-throw (SPNT) switched network to enable one of the N input-output signal paths to conduct with the common signal path at any instant. For example, the SCP can be used to form a single-pole 3-throw (SP3T) switched network between a transmit signal path, a receive signal path, and a termination signal path to enable three different functions at an antenna. Using an SCP provides several advantages including: (1) relatively low loss in transit; (2) enables a state change in order to protect receive from high incident signals, while providing lower insertion loss for small signal levels; and (3) enables a state change for impedance matched high power terminated state with no DC bias applied to switch (i.e., fail safe mode).

In accordance with one aspect of the disclosure, a switchable charge pump (SCP) circuit comprises: a switching element having a first terminal configured to be coupled to a radio frequency (RF) signal path, a second terminal, and a control terminal configured to be coupled to a threshold voltage; and a charge pump circuit having an input terminal coupled to the second terminal of the switching element, a control terminal configured to be coupled to a nominal voltage, and an output terminal configured to provide an output voltage.

In some embodiments, the switching element is provided as a field effect transistor (FET). For example, the switching element control terminal may correspond to a gate terminal of the FET, the switching element first terminal to a drain terminal of the FET and the switching element second terminal to a source terminal of the FET. In various embodiments, the switching element is provided as two or more FETs arranged in series, wherein gate terminals of two or more FETs are coupled to the switching element control terminal.

In certain embodiments, the charge pump circuit comprises a capacitor coupled between the input terminal and the output terminal, a diode coupled between the output terminal and the control terminal, and a resistor coupled between the output terminal and the control terminal. The diode may be coupled in a forward-bias direction between the output terminal and the control terminal or in a reverse-bias direction therebetween.

In accordance with another aspect of the invention, a system comprises a common signal path and a plurality of switching modules. Each of the switching modules may include: a branch switch having a first terminal coupled to the common signal path, a second terminal coupled to a corresponding branch signal path, and a control terminal, the branch switch having a first state to provide a high-impedance path between the common signal path and a branch signal path and a second state to provide a low-impedance path between the common signal path and a branch signal path; and a switchable charge pump (SCP) having an input terminal coupled to receive an RF signal from the common signal path, a first control terminal configured to receive a first voltage control signal, a second control terminal configured to receive a second voltage control signal, and an output terminal coupled to the branch switch control terminal, wherein the SCP is configured to generate an output voltage at the output terminal, the output voltage having a voltage level determined by a power level of the RF signal, a voltage level of the first voltage control signal, and a voltage level of the second voltage control signal, and wherein the branch switch is configured to transition between the first and second states based upon a voltage level of the SCP output voltage.

In some embodiments, at least one of SCPs comprises: a switching element having a first terminal configured to be coupled to a radio frequency (RF) signal path, a second terminal, and a control terminal configured to be coupled to a threshold voltage; and a charge pump circuit having an input terminal coupled to the second terminal of the switching element, a control terminal configured to be coupled to a nominal voltage, and an output terminal configured to provide an output voltage.

In various embodiments, the plurality of switching modules includes a first switching module having an branch switch coupled to a transmit front end, and second switching module having a branch switch coupled to a receive front end. The plurality of switching modules may include a third switching module having a branch switch coupled to a termination network. In some embodiments the termination network comprises a resistor network.

In accordance with yet another aspect of the invention, a circuit comprises: a common signal path; a transmit signal path; a receive signal path; a termination network; a first mode to provide a low-impedance path between the common signal path and the transmit signal path, a high-impedance path between the common signal path and the receive signal path, and a high-impedance path between the common signal path and the termination network; a second mode to provide a high-impedance path between the common signal path and the transmit signal path, a low-impedance path between the common signal path and the receive signal path, and a high-impedance path between the common signal path and the termination network; a third mode to provide a high-impedance path between the common signal path and the transmit signal path, a high-impedance path between the common signal path and the receive signal path, and a low-impedance path between the common signal path and the termination network.

The controller may be configured to select between the first and second modes, and wherein the circuit is configured to automatically select the third mode when power on the common signal path exceeds a predetermined threshold.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system. Instead, emphasis is generally being placed upon illustrating the concepts, structures, and techniques sought to be protected herein.

DETAILED DESCRIPTION

As used herein, the term "radio frequency (RF)" is used to describe alternating current signals of any frequency (including microwave frequencies) and to describe circuits, elements, and other structures capable of operating on such signals.

Figure 1:
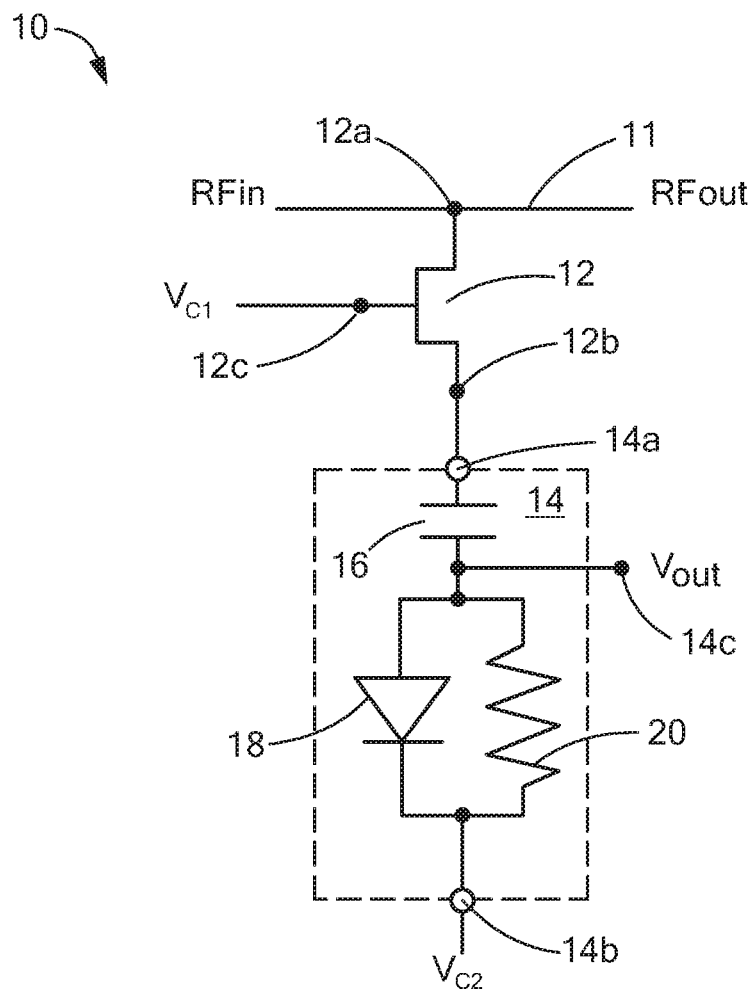
FIG. 1 is a schematic diagram of a switchable charge pump (SCP) network.
Figure 3:
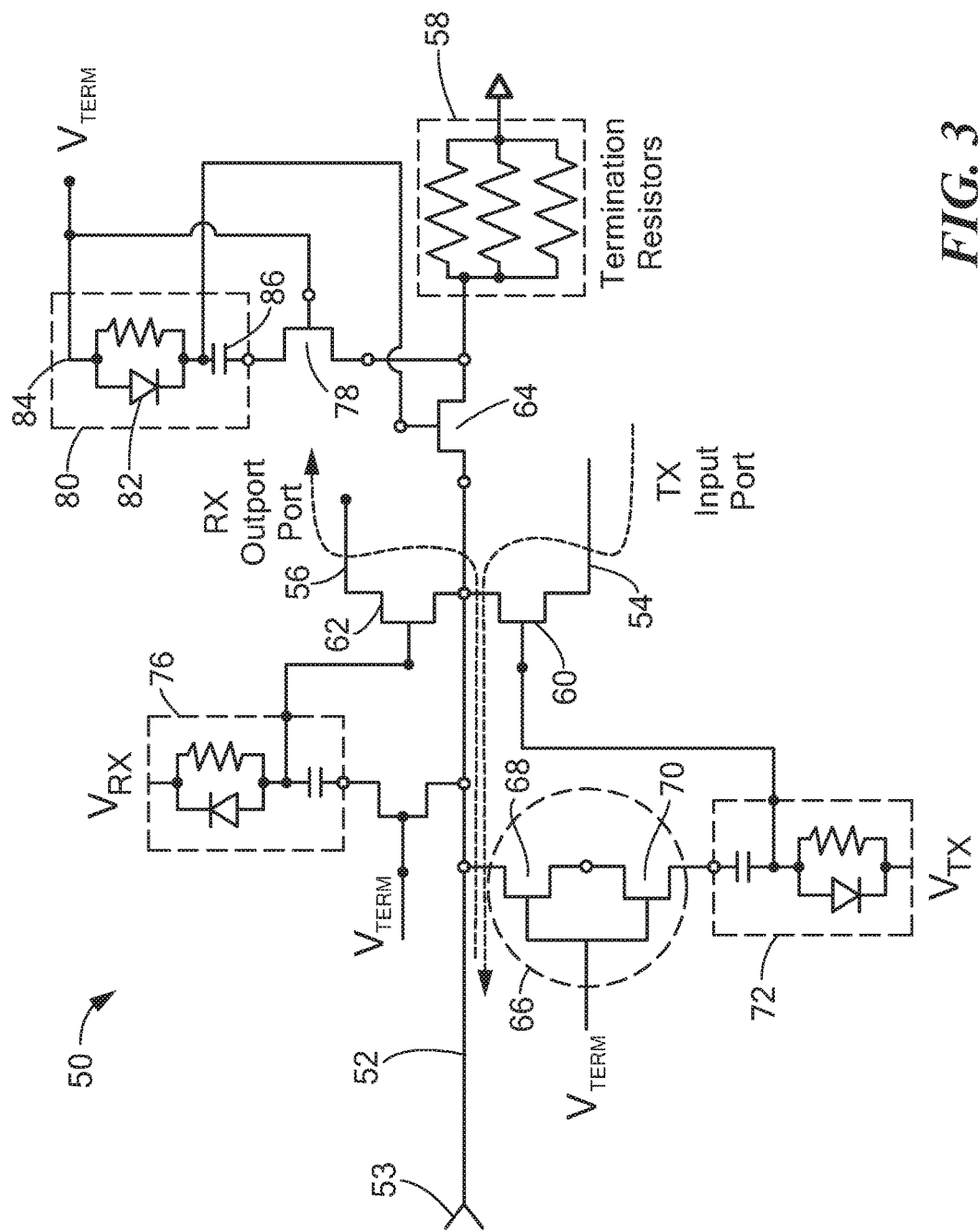
FIG. 3 is a schematic diagram of a transmit-receive (T/R) system utilizing SCPs.

Referring to FIG. 1, a switchable charge pump (SCP) network 10 comprises a switching element 12 and a charge pump circuit 14. The switching element 12 includes a first terminal 12a configured to be coupled to a common signal path 11, a second terminal 12b, and a control terminal 12c configured to receive a first control voltage ($V_{C1}$). The common signal path 11 may correspond to an RF signal path, such as an RF signal path coupled between an antenna and transmit and receive signal paths of an RF system. In various embodiments, the switching element 12 is provided as a field-effect transistor (FET) wherein the first and second terminals 12a, 12b correspond to source and drain terminals, and the control terminal 12c corresponds to a gate terminal. In particular embodiments, the switching element 12 is provided as multiple FETs arranged in a stacked series or other suitable configuration. An example of an SCP having a stacked series of FETs is shown in FIG. 3 and described below in conjunction therewith.

The charge pump circuit 14 includes an input terminal 14a coupled to the second terminal 12b of the switching element, a control terminal 14b configured to receive a second control voltage ($V_{C2}$), and an output terminal 14c configured to provide an output voltage ($V_{out}$). The charge pump circuit 14 may include any suitable combination of electrical components arranged and configured to provide the operation described herein below. In the particular example shown in FIG. 2, charge pump circuit 14 includes a capacitor 16 coupled between the input terminal 14a and the output terminal 14c, a diode 18 coupled between the output terminal 14c and the control terminal 14b, and a resistor 20 also coupled between the output terminal 14c and the control terminal 14b such that diode 18 and resistor 20 are parallel coupled between terminals 14b and 14c. Diode 18 may be coupled in a forward bias direction between terminals 14c and 14b, as shown, or in a reverse bias direction.

The resistor 20 provides bias between the second control terminal 14b and the output terminal 14c when the diode 18 is not on. Thus, although value of the resistor 20 may be selected based on the desired frequency of operation, it should be sufficiently large so that the diode 18 is not shorted out when the charge pump is active. In some embodiments, the resistor 20 has a value of about 5 k ohm.

The value of capacitor 16 may be selected based upon a system's tolerance for loss as well as the signal power level necessary to turn on the charge pump. A larger capacitor has higher loss, but couples over more power, thereby turning on the charge pump at a lower power level. In some embodiments, capacitor 16 has a value of about 0.1 pF.

For simplicity of explanation, terminals and corresponding signals applied to those terminals are described herein using common reference designators. For example, referring to the switching element 12, a control voltage applied to control terminal 12c may be referred to herein as control voltage 12c.

In conventional RF transmit-receive (T/R) systems, a single antenna may be shared between transmit and receive front ends using a high power switch. In certain applications, such as cellular phones, a T/R switch (also referred to herein as a "branch switch") may be provided as a FET (or multiple FETs) which can be switched "on" or "off" by applying a control voltage, below or above pinch-off voltage for the device/technology utilized, to its gate. Because of the relatively large magnitude of the signal received or transmitted at the antenna, the voltage swing resulting across the gate-source junction of the FETs when biased off may exceed the FET's pinch-off voltage and thus result in switching the FET "on" (i.e., bringing the FET out of pinch-off mode) when that is not desired. As described in U.S. Pat. No. 7,755,222, which is hereby incorporated by reference in its entirety, one solution to this problem is to offset the DC component of the FET gate-source voltage using a charge pump (sometimes referred to as a "DC restoring circuit").

Referring again to FIG. 1, the charge pump 14 can be used to control a T/R switch (not shown) coupled to the common signal path 11. In particular, the T/R switch may be provided as a FET having a drain terminal coupled to signal path 11, a source terminal coupled to a transmit/receive signal path, and a gate terminal coupled to the charge pump output terminal 14c. With such an arrangement, a control voltage applied to terminal 14b switches the T/R FET switch off such that no current may flow between its source and drain terminals. The charge pump 14 operates to provide a DC offset to the T/R FET switch gate voltage such that large voltage swings on the common signal path 11 cannot inadvertently switch the FET on.

By incorporating a switching element 12 into a conventional charge pump network, the charge pump 14 can be activated or deactivated within a circuit. This has many useful applications. For example, in an RF T/R system, it may be desirable to isolate the receive front end components (e.g., a low-noise amplifier or "LNA") and/or transmit front end components (e.g., a high-power amplifier or "HPA") from a common RF signal path 11 if an incident RF power exceeds a predetermined threshold. The SCP network 10 can provide automatic transmit/receive path protection against high incident signal levels without requiring additional control signals or circuitry. In particular, the switching element 12 can be coupled between the RF signal path 11 and the charge pump 14 and a threshold control voltage applied to control terminal 12c. If sufficiently high incident power is present on the RF signal path 11, the switch is turned "on" such that the charge pump 14 becomes part of RF circuit. In turn, the charge pump can generate an output voltage ($V_{OUT}$) to place a T/R switch (not shown) into an off state, protecting the transmit/receive signal path from the high incident power.

Figure 2:
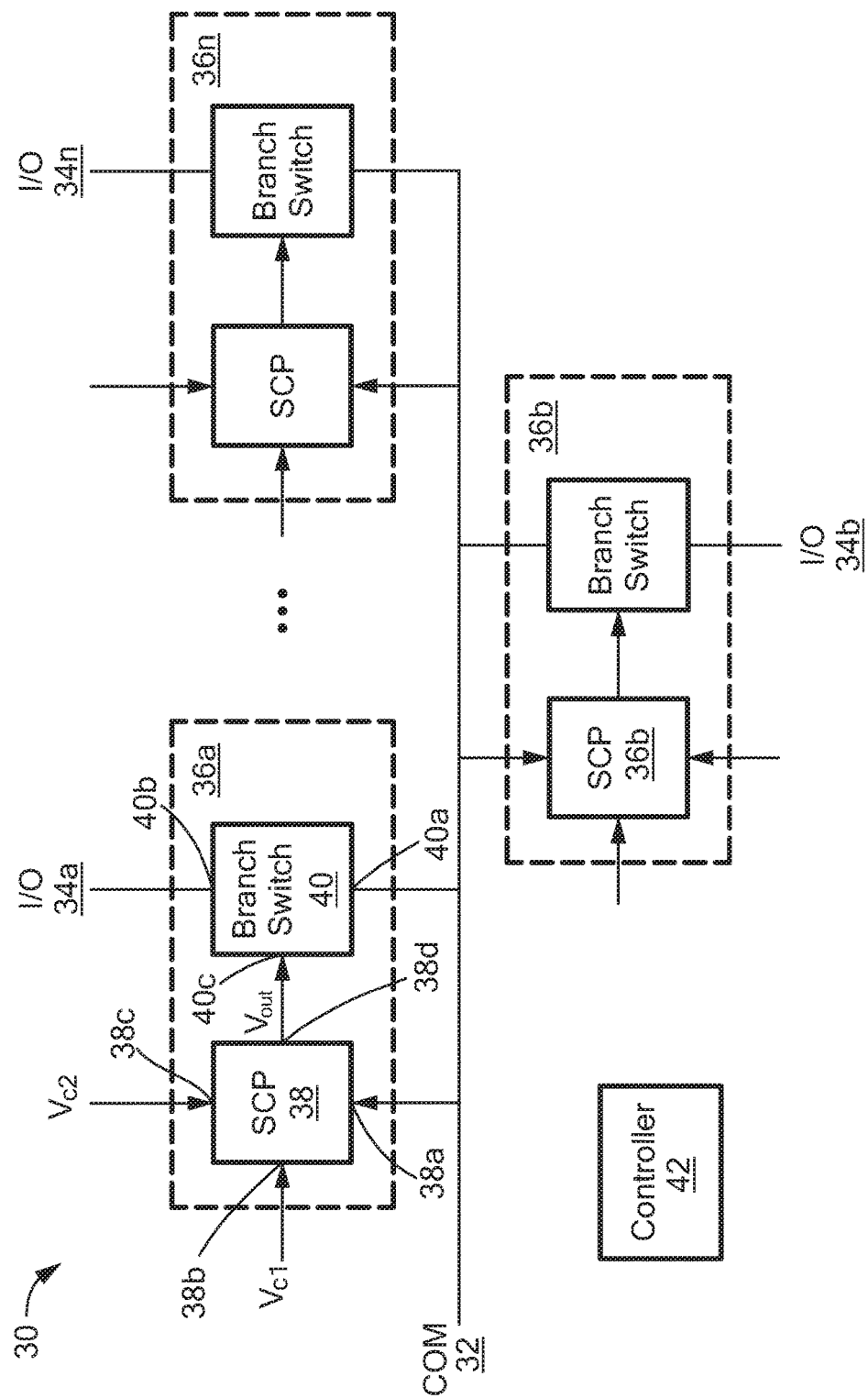
FIG. 2 is a block diagram illustrating the use of SCPs to form a single-pole N-throw (SPNT) switch.

FIG. 2 shows how SCPs can be used to form a single-pole N-throw (SPNT) switch between a common signal path 32 and a plurality of branch signal paths 34a, 34b, . . . , 34n (generally denoted 34). The common signal path 32 may correspond to an RF signal path, and ones of the branch signal paths 34 may correspond to transmit or receive signal paths.

Referring to FIG. 2, an illustrative system 30 includes plurality of switching modules 36a, 36b, . . . , 36n (generally denoted 36), each of which is coupled to the common signal path 32 and a respective one of the branch signal paths 34.

Switching module 36a, which may be representative of any of the other switching modules 36, includes an SCP 38 and a branch switch 40. The SCP 38 includes an input terminal 38a coupled to the common signal path 32, a first control terminal 38b configured to receive a first control voltage ($V_{c1}$), a second control terminal 38c configured to receive a second control voltage ($V_{c2}$), and an output terminal 38d configured to provide an output voltage signal ($V_{out}$).

The SCP 38 may be the same as or similar to SCP network 10 of FIG. 1. In particular, input terminal 38a may correspond to first terminal 12a of FET 12, first control terminal 38b may correspond to control terminal 12c of FET 12, second control terminal 38c may correspond to control terminal 14b of the charge pump 14, and output terminal 38d may correspond to output terminal 14c of the charge pump 14.

The branch switch 40 includes a first terminal 40a coupled to the common signal path 32, a second terminal 40b coupled to a branch signal path 34 (here, signal path 34a), and a control terminal 40c coupled to the SCP output terminal 38d and configured to receive an output voltage ($V_{out}$) therefrom. The branch switch 40 has a first state to provide a high-impedance path (ideally an open circuit impedance) between the common signal path 32 and a branch signal path 34 (here, branch signal path 34a), and a second state to provide a low-impedance path (ideally a short circuit impedance) between the common signal path 32 and the branch signal path 34. The branch switch 40 is configured to switch between the first and second states in response to a voltage applied to control terminal 40c.

The SCP 38 is configured to generate the output voltage signal ($V_{out}$) based upon the incident power on the common signal path 32, the level of the first control voltage ($V_{c1}$), and the level of the second control voltage ($V_{c2}$). As described above in conjunction with FIG. 1, the first and second control voltages ($V_{c1}$ and $V_{c2}$) control the SCP (and thus the output voltage $V_{out}$) under expected/small signal (receive) or lower power (transmit) conditions. However, if power on the common signal path 32 exceeds the expected power level for a given mode (transmit or receive), the SCP automatically places the branch switch 40 into the first state, thereby isolating the branch signal path 34a from the common signal path 32. For example, in some embodiments, when the second control voltage ($V_{c2}$) is below pinch-off, the branch switch 40 is placed into the first state, and when the second control voltage ($V_{c2}$) is above pinch-off, the branch switch 40 is placed into the second state. Thus, it will be appreciated that the second control voltage ($V_{c2}$) provides nominal control over the branch switch 40.

The nominal voltage control signal $V_{c2}$ may be generated by a controller 42, coupled directly or indirectly to the second control terminal 38c. The controller 42 may be provided as a circuit, an application-specific integrated circuit (ASIC), or by any other suitable means.

The system architecture shown in FIG. 2 can be used within a T/R system. For example, a first switching module 36a may be coupled to a transmit signal path 34a and a second control switching module 36b may be coupled to a receive signal path 34b. By applying suitable voltages to the respective second control terminals 38c, the controller 32 can place the system into either transmit mode or receive mode. For example, in transmit mode, the controller 32 may apply 0V to the second control terminal 38c of the first switching module 36a, and −5V to the second control terminal 38c of the second switching module 36b. In receive mode, the controller 32 may apply −5V to the second control terminal 38c of the first switching module 36a, and 0V to the second control terminal 38c of the second switching module 36b. As such, a single-pole 2-throw (SP2T) switch may be provided.

In some embodiments (such as the embodiment shown in FIG. 3 and described below), at least one of the switching modules 36 is coupled to a termination network, such as a resistor network. Here, the system 30 may be configured to selectively couple the common signal path 32 to one of: (1) a transmit signal path; (2) a receive signal path; (3) or the termination network. As such, a single-pole 3-throw (SP3T) switch may be provided. In general, the system architecture shown in FIG. 2 can be used to form a form a single-pole N-throw (SPNT) switch. By incorporating a switch into a charge pump (e.g., a traditional charge pump), the charge pump can be activated or deactivated in the circuit depending on the power level that is incident or transmitted, and the desired mode of the switch.

Referring to FIG. 3, an illustrative T/R system 50 utilizes a plurality of SCPs to provide switching between three distinct operating modes: transmit mode, receive mode, and terminate mode. In each mode, a low-impedance signal path is established between a signal path 52 and one of a transmit signal path 54, a receive signal path 56, or a termination network 58. Since signal path 52 is coupled between antenna 53 and one of the transmit, receive, or termination paths, the path 52 is referred to as a "common" signal path (i.e., signal path portion 52 is common to both the full signal path from a transmitter to antenna 53 and the full signal path from a receiver to antenna 53).

In some embodiments, the termination network 58 is provided as a network of resistors having first ends coupled to the branch switch 64 and second ends coupled to a ground.

The transmit signal path 54, receive signal path 56, and termination network 58 are coupled to the common signal path 52 via respective branch switches 60, 62, and 64. The branch switches 60, 62, 64 may be provided as FETs having source and drain terminals coupled between the common signal path 52 and respective transmit/receive/terminate signal paths, as shown.

Each of the branch switches 60, 62, and 64 are controlled by a respective SCP network. A first SPC network (for controlling branch switch 60) comprises a first switching element 66 and a first charge pump 72. In the embodiment shown, the first switching element 66 is provided as a pair of FETs 68 and 70 connected in series (or "stacked"), as shown. A second SCP network (for controlling branch switch 62) comprises a second switching element 74 and a second charge pump 76. A third SCP network (for controlling branch switch 64) comprises a third switching element 78 and a third charge pump 80.

The charge pumps 72, 76, and/or 80 may be the same as or similar to charge pump 14 of FIG. 1. However, whereas the charge pump 14 includes a diode 18 coupled in a forward-bias direction between a capacitor 16 and a control terminal 14b, the third charge pump 80 has a diode 82 coupled in a reverse-bias direction between a capacitor 86 and a control terminal 84. The purpose of inverting diode 82 is explained below.

As shown in TABLE 1, a controller (e.g., controller 42 of FIG. 2) can place the system into transmit mode by applying a zero voltage to the control terminal ($V_{TX}$) of the first charge pump 72 and by applying −5V to the control terminal ($V_{RX}$) of the second charge pump 76. Similarly, the controller 42 can place the system into receive mode by applying −5V to the control terminal ($V_{TX}$) of the first charge pump 72 and by applying a zero voltage to the control terminal ($V_{RX}$) of the second charge pump 76.

It should be noted that, in general, it is desirable to bias the termination path to a high impedance state while in transmit or receive mode so that the TX or RX paths are low-loss. Otherwise, termination path loading may cause additional insertion loss.

TABLE 1

| Nominal Control Voltages | Mode | | |
| --- | --- | --- | --- |
| | Transmit | Receive | Terminate |
| $V_{TX}$ | 0 | −5 V | −5 V |
| $V_{RX}$ | −5 V | 0 | −5 V |
| $V_{TERM}$ | −5 V | −5 V | 0 |

In transmit mode, the first branch switch 60 is on (i.e., a low-impedance path is established between signal paths 52 and 54) and the second and third switches 62 and 64 are off (i.e., high-impedance paths are established between signal paths 52 and 56 and between signal paths 52 and 58). Accordingly, transmit signals can pass from a transmit front end (e.g., from an HPA of a transmit circuit) to the common signal path 52 for transmission via RF antenna 53.

Also in transmit mode, the first, second, and third switching elements 66, 74, and 78 are all off, such that the respective charge pumps 72, 76, and 80 are isolated from the common signal path 52 and are therefore not active in the RF circuit. If the off state of the first switching element 66 is overcome by incident power on common signal path 52, the first switching element 66 turns on, the first charge pump 72 becomes active in the RF circuit, and the first branch switch 60 is automatically turned off, thereby making transmit path high impedance. Because, in this example, the first switching element 66 is provided as stacked FETs 68, 70, an increased amount of power is required on the common signal path 52 to overcome the off state. This can ensure that the charge pump 72 will not become active in the RF circuit while the system is in transmit mode (e.g., transmitting power from an HPA) and that the transmit path remains low-loss. It should be appreciated that the actual number of FETs used may be varied, for example depending on technology and expected transmit power level.

As shown, a common control voltage ($V_{TERM}$) may be applied to both the first and second switching elements 66, 74. In this case, high incident power on the common signal path 52 can also cause the second switching element 74 to transition on, causing the second charge pump 74 to become active in the RF circuit and thereby protecting the receive front end (e.g., the LNA).

Moreover, the common control voltage ($V_{TERM}$) may also be applied to the third switching element 78 and to the control terminal 84 of the third SCP 80, as shown. As a result, when power on the common signal path 52 is sufficiently high to trigger receive and/or transmit protection, the third charge pump 84 may also become active in the RF circuit. Because of the inverted direction of diode 82, when the third charge pump 84 becomes active, the third switching element 64 is turned on (not off), thereby causing power to be diverted to the termination network 58 (and thus away from the transmit and receive signal paths). Thus, the system 50 provides self-selecting protection (i.e., termination), meaning that it automatically transitions from transmit/receive mode to terminate mode when sufficiently high incident power is present.

In receive mode, the second branch switch 62 is on and the first and third switches 60 and 64 are off. Accordingly, signals received from an RF antenna can pass from the common signal path 52 to the receive front end (e.g., to the LNA). As with transmit mode, the first, second, and third switching elements 66, 74, and 78 are all off in receive mode. If the off state of the second switching element 74 is overcome by incident power on common signal path 52, the second switching element 74 turns on, the second charge pump 76 becomes active in the RF circuit, and the second branch switch 62 is turned off, thereby protecting the LNA and other receive front end components.

It will be appreciated that the concepts, structures, and techniques disclosed herein provide a generalized single-pole N-throw (SPNT) architecture for broadband, low-loss T/R switching. The architecture includes receive protect and self-selecting termination for incident large signal without additional control signals or circuitry.

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:

1. A circuit comprising:
   a common signal path;
   a transmit signal path;
   a receive signal path;
   a termination network;
   a first mode to provide a low-impedance path between the common signal path and the transmit signal path, a high-impedance path between the common signal path and the receive signal path, and a high-impedance path between the common signal path and the termination network;
   a second mode to provide a high-impedance path between the common signal path and the transmit signal path, a low-impedance path between the common signal path and the receive signal path, and a high-impedance path between the common signal path and the termination network;

is a third mode to provide a high-impedance path between the common signal path and the transmit signal path, a high-impedance path between the common signal path and the receive signal path, and a low-impedance path between the common signal path and the termination network, wherein the controller is configured to select between the first and second modes, and wherein the circuit is configured to automatically select the third mode when power on the common signal path exceeds a predetermined threshold.

2. The circuit of claim 1 wherein at least one of the common signal path, transmit signal path and receive signal path further comprises:

a switchable charge pump (SCP) circuit comprising:

a switching element having a first terminal configured to be coupled to a radio frequency (RF) signal path, a second terminal, and a control terminal configured to be coupled to a threshold voltage; and a charge pump circuit having an input terminal coupled to the second terminal of the switching element, a control terminal configured to be coupled to a nominal voltage, and an output terminal configured to provide an output voltage.

3. The SCP circuit of claim 2 wherein the switching element is provided as a field effect transistor (FET).

4. The SCP circuit of claim 3 wherein the switching element control terminal corresponds to a gate terminal of the FET, the switching element first terminal corresponds to a drain terminal of the FET and the switching element second terminal corresponds to a source terminal of the FET.

5. The SCP circuit of claim 2 wherein the switching element is provided as two or more FETs arranged in series, wherein gate terminals of the two or more FETs are coupled to the switching element control terminal.

6. The SCP circuit of claim 2 wherein the charge pump circuit comprises a capacitor coupled between the input terminal and the output terminal, a diode coupled between the output terminal and the control terminal, and a resistor coupled between the output terminal and the control terminal.

7. The SCP circuit of claim 6 wherein the diode is coupled in a forward-bias direction between the output terminal and the control terminal.

8. The SCP circuit of claim 6 wherein the diode is coupled in a reverse-bias direction between the output terminal and the control terminal.

9. The circuit of claim 1 wherein at least one of the common signal path, transmit signal path and receive signal path further comprises:

a switching element having a first terminal configured to be coupled to a radio frequency (RF) signal path, a second terminal, and a control terminal configured to be coupled to a threshold voltage; and a charge pump circuit having an input terminal coupled to the second terminal of the switching element, a control terminal configured to be coupled to a nominal voltage, and an output terminal configured to provide an output voltage.

10. The SCP circuit of claim 9 wherein the switching element is provided as a field effect transistor (FET).

11. The SCP circuit of claim 9 wherein the switching element control terminal corresponds to a gate terminal of the FET, the switching element first terminal corresponds to a drain terminal of the FET and the switching element second terminal corresponds to a source terminal of the FET.

12. The SCP circuit of claim 9 wherein the switching element is provided as two or more FETs arranged in series, wherein gate terminals of the two or more FETs are coupled to the switching element control terminal.

13. The SCP circuit of claim 9 wherein the charge pump circuit comprises a capacitor coupled between the input terminal and the output terminal, a diode coupled between the output terminal and the control terminal, and a resistor coupled between the output terminal and the control terminal.

14. The SCP circuit of claim 13 wherein the diode is coupled in a forward-bias direction between the output terminal and the control terminal.

15. The SCP circuit of claim 13 wherein the diode is coupled in a reverse-bias direction between the output terminal and the control terminal.

* * * * *